US008180366B2

(12) United States Patent
Ernst et al.

(10) Patent No.: US 8,180,366 B2
(45) Date of Patent: May 15, 2012

(54) METHODS, SYSTEMS, AND COMPUTER PROGRAM PRODUCTS FOR MESSAGE FILTERING BASED ON PREVIOUS PATH TRAJECTORIES AND PROBABLE DESTINATION

(75) Inventors: Darrell E. Ernst, Leesburg, VA (US); James W. Marshall, Purcellville, VA (US)

(73) Assignee: The MITRE Corporation, McLean, VA (US)

( * ) Notice: Subject to any disclaimer, the term of this patent is extended or adjusted under 35 U.S.C. 154(b) by 1233 days.

(21) Appl. No.: 11/819,730

(22) Filed: Jun. 28, 2007

(65) Prior Publication Data

US 2009/0005067 A1  Jan. 1, 2009

(51) Int. Cl.
*H04W 24/00* (2009.01)
(52) U.S. Cl. ............... 455/456.1; 455/461; 455/432.1; 455/3.02; 455/404.2; 455/414.2; 455/456.5; 455/457
(58) Field of Classification Search .............. 455/421, 455/414.2, 432.1, 456.1, 456, 433, 436, 440, 455/450, 451, 404.1, 404.2, 457, 418, 461, 455/3.02, 456.5
See application file for complete search history.

(56) References Cited

U.S. PATENT DOCUMENTS

| | | | |
|---|---|---|---|
| 4,860,352 A | 8/1989 | Laurance et al. | |
| 5,243,652 A | 9/1993 | Teare et al. | |
| 5,293,163 A | 3/1994 | Kakihara et al. | |
| 5,636,245 A | 6/1997 | Ernst et al. | |
| 6,346,890 B1 | 2/2002 | Bellin | |
| 6,522,250 B1 | 2/2003 | Ernst et al. | |
| 6,683,526 B2 | 1/2004 | Bellin | |
| 2002/0049064 A1* | 4/2002 | Banno | 455/456 |
| 2002/0105444 A1 | 8/2002 | Flick | |
| 2002/0107027 A1* | 8/2002 | O'Neil | 455/456 |
| 2004/0246147 A1* | 12/2004 | von Grabe | 340/995.13 |
| 2005/0075116 A1* | 4/2005 | Laird et al. | 455/456.3 |
| 2007/0015495 A1* | 1/2007 | Winter et al. | 455/414.1 |

FOREIGN PATENT DOCUMENTS

| | | |
|---|---|---|
| EP | 1 320 270 A1 | 6/2003 |
| EP | 1 427 226 A1 | 6/2004 |

OTHER PUBLICATIONS

International Search Report for Appln. No. PCT/US2008/007865, mailed Sep. 3, 2008, 10 pgs.

* cited by examiner

*Primary Examiner* — Kamran Afshar
*Assistant Examiner* — Edward Zhang
(74) *Attorney, Agent, or Firm* — Sterne, Kessler, Goldstein & Fox P.L.L.C.

(57) ABSTRACT

Methods, systems and computer program products for filtering generally-broadcast messages received by a movable unit based on current spatial position, stored trajectory history, and probable future trajectories. A current spatial position of the movable unit is received and stored to form a stored trajectory history. A generally-broadcast message relating to a target geographical region is also received and stored. Potential trajectories of the movable unit are then computed over a pre-determined time based on at least one of the current spatial position, a current travel direction of the movable unit, and the stored trajectory history of the movable unit. The generally-broadcast message is then disseminated in response to at least one potential trajectory crossing into the target geographical region during the pre-determined time period. The generally-broadcast message may also be disseminated on the basis of specified user preferences.

27 Claims, 12 Drawing Sheets

METHODS, SYSTEMS, AND COMPUTER PROGRAM PRODUCTS FOR MESSAGE FILTERING BASED ON PREVIOUS PATH TRAJECTORIES AND PROBABLE DESTINATION

BACKGROUND OF THE INVENTION

1. Field of the Invention

The present invention relates to methods and systems for filtering generally-broadcast messages based on the applicability of the message to the receiver of the message. More particularly, the present invention relates to methods and systems for filtering generally-broadcast messages based on current spatial position, previous path trajectories, and probable destination.

2. Background Art

In general, region-specific information is disseminated by pre-determined point-to-point communication or by a general broadcast that must be manually monitored in order to extract information relevant to a specific position, velocity and time of interest. For example, marine weather data is continuously broadcast and mariners must monitor the broadcast for long periods of time in order to obtain the information specific to their region. Even then, the exact region affected may require computation or may be ambiguously defined. There is also the possibility that a user may miss information of interest because he or she occupies an unknown location, is unfamiliar with the region, or uses a different frame of reference.

Another example of region-specific information is a tactical ballistic missile (TBM) warning, which is derived from space-based and ground-based sensor data and which is provided through a variety of broadcast and general purpose communications systems to a small subset of in-theater combat forces. Currently, such warnings require transportable processing stations that can generate information about specific situations in the field but cannot directly communicate with all affected individuals. The timeliness, reliability, and dispersion of information under these conditions are of concern, especially since the warnings are in the form of geographical coordinates and time of predicted impact, and users must interpret the data to determine if the warning affects them.

An additional example of region-specific information is generally-broadcast information received by motorists, including information concerning road conditions and advertisements from merchants within a specific geographical region. Motorists must generally determine their current position and review the broadcast information for long periods of time to obtain information that is relevant to the current position. While tedious to a motorist traveling on a familiar route, the need to simultaneously determine current position and determine the relevance of the received messages can be especially daunting to motorists along unfamiliar routes. Further, the motorist must review the received messages for relevance not only to current position, but also with respect to a probable destination.

A number of commercial systems use external positioning systems, such as a global positioning system (GPS) or a LORAN system, to select relevant data from computer-based files. Examples of such computer-based files include electronically-stored maps for use in automobiles. These commercial systems are useful for relatively static information but fail to address dynamic factors, such as environmental events, combat factors, and other location-specific information.

Further, a number of existing systems use spatial position data obtained from external positioning systems to selectively filter region-specific information received by a remote unit. For example, U.S. Pat. No. 5,243,652 to Teare, et al. discloses a database access system in which each mobile user has a positioning system that transmits position information to a central facility. This central facility then grants or denies database access depending on the geographical location of the mobile user. U.S. Pat. No. 4,860,352 to Laurance, et al. discloses a system in which a satellite system determines the position of a transmitter at a first location and a receiver at a second location. The transmitter position is appended to the received message which is sent by the satellite system to the receiver. The receiver receives the appended message, extracts the transmitter position data and compares the extracted transmitter position with a stored transmitter position. If the positions correlate, the receiver knows it has received an authentic message.

U.S. Pat. No. 5,636,245 to Ernst, et al. and U.S. Pat. No. 6,522,250 to Ernst, et al. concern improvements over these existing systems and disclose filtering systems that determine the relevance of generally-broadcast information based on the location, velocity, and time of an object or event of interest. The disclosed systems include a general broadcasting unit comprising a transmitter for broadcasting messages that includes an information segment comprising a region, velocity and a time corresponding to an event. A remote unit includes a receiver for receiving the broadcast messages and storage means for storing spatial position information relating to the remote unit. The stored data selection information is related to information contained in the broadcast segment and is compared with the latter in the matching processor and used, along with spatial position information, to determine whether a match condition is satisfied. If so, the message is disseminated to a user.

A number of existing systems selectively filter generally-broadcast messages received by a movable unit based on probable future positions of the movable unit. For example, U.S. Pat. No. 5,293,163 to Kakihara, et al. discloses a navigation apparatus for use in vehicles that displays road information, such as current traffic information and parking conditions, to a user through an on-board display device. The navigation system is designed to selectively display the road information that is relevant to both the current position of the vehicle and a probable destination of the vehicle. The probable destinations of the vehicle are derived from locations within a fan-shaped area that fans out from the current spatial position of the vehicle in the direction of travel through a pre-determined angle. As such, the fan-shaped area identified a number of potential destinations for the vehicle based only on current position and travel direction.

BRIEF SUMMARY OF THE INVENTION

The present invention relates to systems, methods and computer program products for filtering messages received by a movable unit. In one aspect, the present invention is a method for filtering messages received by a movable unit. The method comprises storing a current spatial position of the movable unit to generate a trajectory history of the movable unit. The current spatial position of the movable unit may be expressed in terms of at least one of a current longitude, a current latitude, and a current altitude of the movable unit. In addition to storing the current spatial position, the method may additionally store at least one of a current velocity of the movable unit and a time associated with the current spatial position of the movable unit. Further, the current spatial position of the movable unit may be received from an external spatial positioning system, such as a global positioning system (GPS) or a LORAN system. The present invention receives a generally-broadcast message that relates to a target geographical region of interest to the movable unit. The generally-broadcast message may also contain at least one of a longitude, a latitude, and an altitude describing the target geographical region. Potential trajectories of the movable unit are then computed over a pre-determined time based on at least one of the current spatial position, a current travel direction of the movable unit, and the stored trajectory history of the movable unit. The generally-broadcast message is then disseminated in response to at least one potential trajectory crossing into the target geographical region during the pre-determined time period.

The present invention may also comprise a method for storing event-specific tags related to events of interest to the movable unit and disseminating the generally-broadcast message in response to a match between the event-specific tags related to events within the target geographic region and the event-specific tags related to events of interest to the movable unit.

In another aspect, the invention is a system that filters messages received by movable unit. The system also comprises a means for receiving and storing a current spatial position of the movable unit to generate a trajectory history of the movable unit. The current spatial position of the movable unit may be expressed in terms of at least one of a current longitude of the movable unit, a current latitude of the movable unit, and a current altitude of the movable unit. Further, at least one of a current velocity of the movable unit and a time associated with the current spatial position of the movable unit may be received means and stored by the system. In addition, the current spatial position of the movable unit may be received from an external spatial positioning system, such as a global positioning system (GPS) or a LORAN system. The system further comprises a receiver for receiving a generally-broadcast message that relates to a target geographical region. The generally-broadcast message may also contain at least one of a longitude, a latitude, and an altitude describing the target geographical region. The system also comprises means for computing potential trajectories of the movable unit over a pre-determined time period based on at least one of the current spatial position, a current travel direction of the movable unit, and the stored trajectory history of the movable unit. Further, the system comprises means for disseminating the generally-broadcast message in response to at least one potential trajectory crossing into the target geographical region during the pre-determined time period.

The system further comprises a means for storing event-specific tags related to events of interest to the movable unit. The system then disseminates a generally-broadcast message in response to a match between the event-specific tags related to events within the target geographic region in the event-specific tags related to events of interest to the movable unit.

In yet another aspect, the invention is directed to a computer-based system for filtering messages received by a movable unit. The computer based-system comprises a receiver for receiving a generally-broadcast message relating to a target geographical region. The computer-based system further comprises a processor in communication with a memory, wherein the memory stores a plurality of processing instructions. The plurality of processing instructions direct the processor to generate a trajectory history of the movable unit and then compute potential trajectories of the movable unit over a pre-determined time period based on at least one of a current spatial position of the movable unit, a travel direction of the movable unit, and the trajectory history of the movable unit. The processor is then directed to disseminate the generally-broadcast message in response to at least one potential trajectory crossing into the target geographical region.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated in and constitute part of the specification illustrate embodiments of the invention and, together with the general description given above and a detailed description of the embodiments given below, serve to explain the principles of the present invention.

Figure 1:
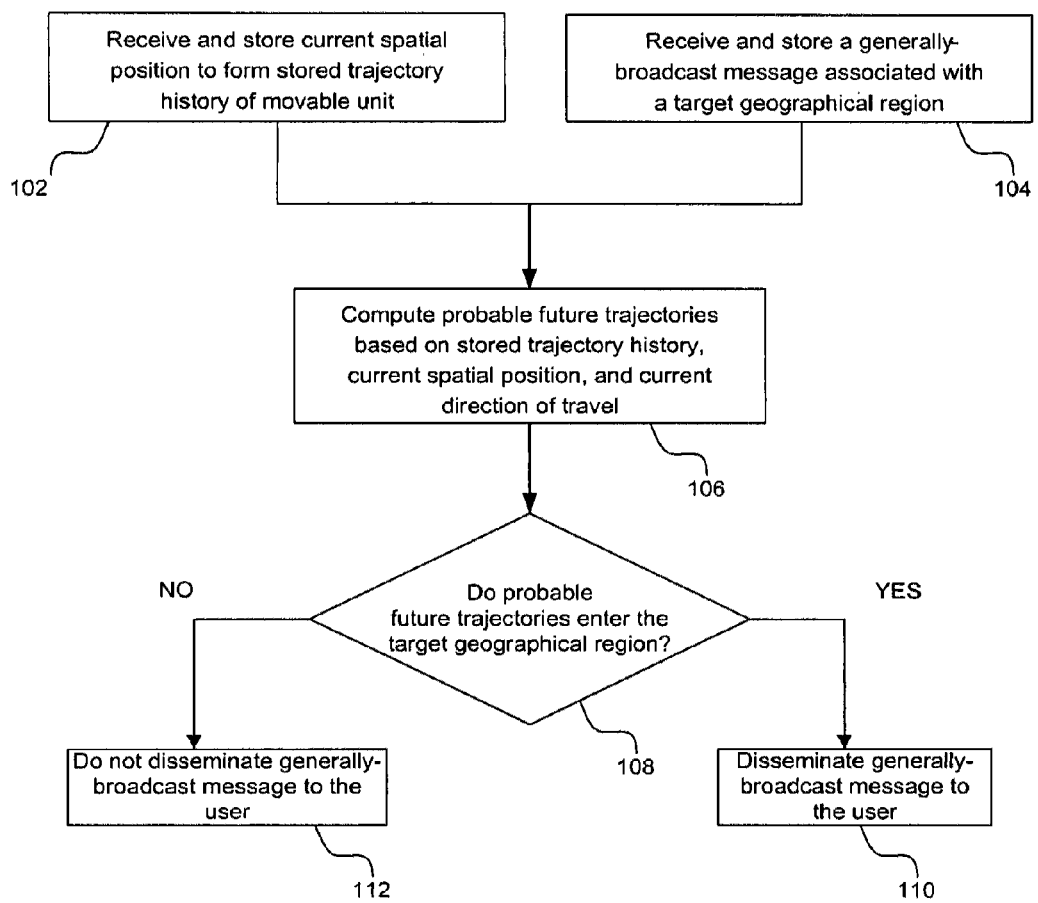
FIG. 1 is a detailed overview of an exemplary method for filtering generally-broadcast messages received by a movable unit based on current spatial position, stored trajectory history, and probable future trajectories, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

The present invention, as described below, may be implemented in many different embodiments of software, hardware, firmware, and the entities illustrated in the figures. Any actual software code with a specialized control of hardware to implement the present invention is not limiting to the present invention. Thus, the operational behavior of the present invention will be described with the understanding that modi- FIG. 1 is a detailed overview of an exemplary method 100 for filtering generally-broadcast messages received by a movable unit based on current spatial position, stored trajectory history, and probable future trajectories, according to an embodiment of the invention. In step 102, a current spatial position of a movable unit is received and stored. A current velocity of the mobile unit and the current time associated with the current spatial position of the movable unit may be also received and stored within step 102. The current spatial position, velocity, and time are then added to the collection of previously-stored spatial positions, velocities, and times, and the combination of current data and previously-stored data is used to generate (or represents) the stored trajectory history of the movable unit.

In one embodiment, the current spatial position is received from an external positioning system, such as a global positioning system (GPS) or a LORAN system, and expressed in terms of a current latitude of the movable unit, a current longitude of the movable unit, and a current altitude of the movable unit. Alternatively, the current spatial position of the movable unit may be defined in terms of any additional coordinate system that would be apparent to one skilled in the art(s).

In step 104, the movable unit receives a generally-broadcast message from a broadcaster. The generally-broadcast message may include, for example, information on events that may interest or impact a user of the movable unit as the movable unit travels across a target geographical region. The events of interest may include current weather patterns across the target geographical region, or the generally-broadcast message may alert a user to natural disasters that may impact the target geographical region. Further, the generally-broadcast message could alert the user to increased threats of terrorist activity or additional threats to national security within the target geographical region. The generally-broadcast message may also contain advertisements from merchants within the target geographical region. These examples of generally-broadcast messages are provided for purposes of illustration, and not limitation. Other types of generally-broadcast messages will be apparent to persons skilled in the relevant art(s).

The generally-broadcast message received within step 104 also defines the boundaries of the target geographic region. In a preferred embodiment, the received information defines the boundaries of the target geographical region in terms of at least one of a longitude, a latitude, and an altitude of the target geographical region. However, as described above in reference to step 102, the boundaries of the target geographical region may be defined in terms of any other well known coordinate system.

A set of probable future trajectories is then computed in step 106 based on at least one of the stored trajectory history, the current spatial position, and a computed current direction of travel. The set of probable future trajectories are then passed to step 108, which determines whether any of the probable future trajectories cross into the target geographical region. If at least one of the probable future trajectories crosses into the target geographical region, then the generally-broadcast message is disseminated to the user in step 110. The generally-broadcast message may be disseminated to the user through an audio alarm, a visual alarm, a tactile alarm, or any other well known messaging technique, or combination thereof. However, if none of the probable future trajectories cross into the target geographical region, then the generally-broadcast message is determined to be not of interest to the user of the movable unit, and the generally-broadcast message is ignored in step 112 and is not disseminated to the user (in an embodiment, the generally-broadcast message may be stored and available for manual recall by the user).

Figure 2:
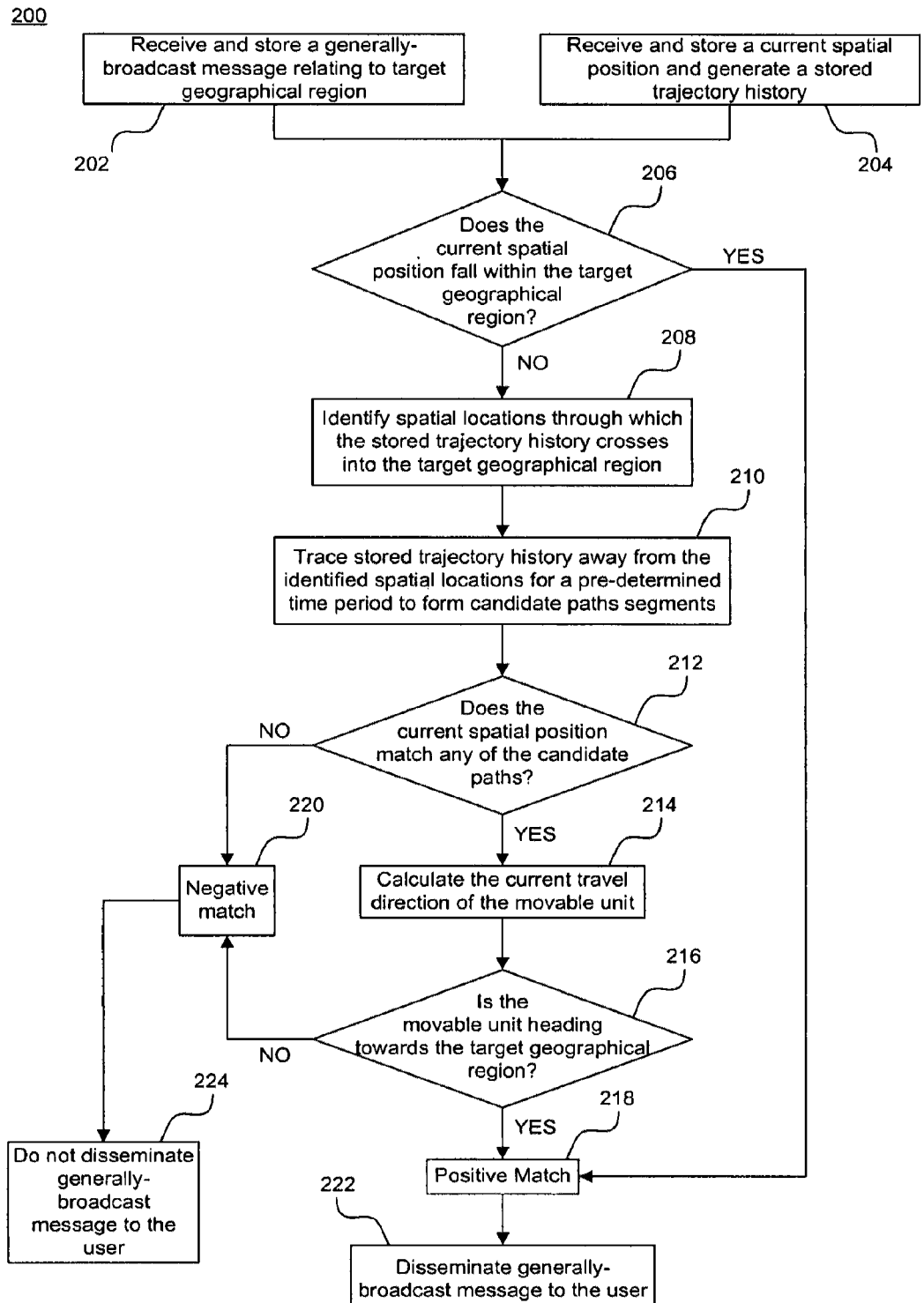
FIG. 2 is a detailed flow diagram of an embodiment of the exemplary method outlined in FIG. 1.

FIG. 2 is a detailed flow diagram of an embodiment 200 of the exemplary method outlined in FIG. 1. In FIG. 2, a generally-broadcast message related to a target geographical region is received and stored in step 202. The generally-broadcast message may include information on events that potentially interest or impact a user of the movable unit, including without limitation weather and/or traffic patterns across the geographic region, criminal or terrorist activity across the geographic region, or advertisements from merchants located within the geographic region. Further, the generally-broadcast message received within step 202 defines the boundaries of the target geographical region. In a preferred embodiment, the generally-broadcast message defines the boundaries of the target geographical region in terms of a longitude, a latitude, and an altitude of the target geographical region. Alternatively, the boundaries of the target geographical region may be defined in terms of any additional coordinate system that would be apparent to one skilled in the art(s).

In step 204, a current spatial position of the movable unit is received from an external positioning system, such as a global positioning system (GPS) or a LORAN system. A current velocity of the movable unit and a time associated with the current spatial position of the movable unit may also be received from an external positioning system. The current spatial position of the movable unit, the current velocity of the movable unit, and the current time are then stored, and the combination of current data and previously-stored data is used to generate a stored trajectory history of the movable unit.

The current spatial position of the movable unit that is received in step 204 may be expressed in terms of a current latitude of the movable unit, a current longitude of the movable unit, and a current altitude of the movable unit. Alternatively, the current spatial position of the movable unit may be expressed in terms of any other well known coordinate system. In additional embodiments, a user of the movable unit may manually enter the current spatial position of the movable unit through an appropriate interface, such as a keyboard or a keypad, or a voice input interface.

The generally-broadcast message, the current spatial position of the movable unit, and the stored trajectory history of the movable unit are then passed to step 206, which determines whether the current spatial position of the movable unit falls within the target geographical region. If the current spatial position of the movable unit falls within the target geographical region, then a positive match is identified in step 218 and the generally-broadcast message is disseminated to a user in step 222. The generally-broadcast message may be disseminated to the user in step 222 through an oral alarm, a tactile alarm, a visual alarm, a combination of an oral, a tactile, and a visual alarm, or any appropriate display or messaging format that would be apparent to one skilled in the art(s).

If the current spatial position of the movable unit falls outside of the target geographical region, then the stored trajectory history is processed in step 208 to identify a set of spatial locations, or entry points, through which the stored trajectory history crosses into the target geographical region. The identified set of spatial locations are then passed to step 210, which traces the stored trajectory history away from each of the set of entry points for a pre-determined time period to form a set of candidate path segments. The candidate path segments are then processed in step 212 to determine whether the current spatial position of the movable unit falls within a specified time or distance of any of the candidate path segments.

If the results of step 212 indicate that the current spatial position falls within the specified time or distance of at least one candidate path segment, then the current travel direction of the movable unit is calculated within step 214. The current travel direction is then passed to step 216, which processes the current spatial position and the current travel direction to determine whether the movable unit is heading towards the target geographical region. If the movable unit is heading towards the target geographical region, then a positive match is identified within step 218. The positive match indicates that the movable unit will likely travel into the target geographical region within the pre-determined time period, and thus, the generally-broadcast message may be of potential interest to the movable unit. The generally-broadcast message is then disseminated to the user of the movable unit in step 222 through an oral alarm, a tactile alarm, a visual alarm, a combination of an oral, a tactile, and a visual alarm, or any appropriate display or messaging format that would be apparent to one skilled in the art(s).

If the results of step 216 indicate that the movable unit is not heading towards the target geographical region, then a negative match is identified within step 220. In this case, the negative match indicates the movable unit is traveling away from the target geographical region, and as such, is unlikely to cross into the target geographical region during the pre-determined time period. Thus, the generally-broadcast message is unlikely to interest the user of the movable unit, and the generally-broadcast message is ignored within step 224 and is not disseminated to the user.

If the results of step 212 indicate that the current spatial position of the movable unit does not fall within the specified time or distance of at least one candidate path segment, then a negative match is identified within step 220. The negative match indicates the movable unit is unlikely to cross into the target geographical region during the pre-determined time period and thus, the generally-broadcast message is unlikely to interest the user of the movable unit. Accordingly, the generally-broadcast message is ignored within step 224 and is not disseminated to the user.

The number of generally-broadcast messages disseminated within step 222 may be varied by adjusting the specified time or distance within step 212. By reducing the specified time or distance in step 212, the number of candidate path segments that fall within the specified time or distance of the current spatial position of the movable unit may be reduced. Thus, fewer positive matches may be identified within step 218 and fewer messages may be disseminated to the user. In contrast, by increasing the specified time or distance in step 212, a larger number of candidate path segments may fall within the specified distance of the current spatial position of the movable unit. As such, a larger number of positive matches may be identified within step 218 and a larger number of messages may be disseminated to the user.

Figure 3A:
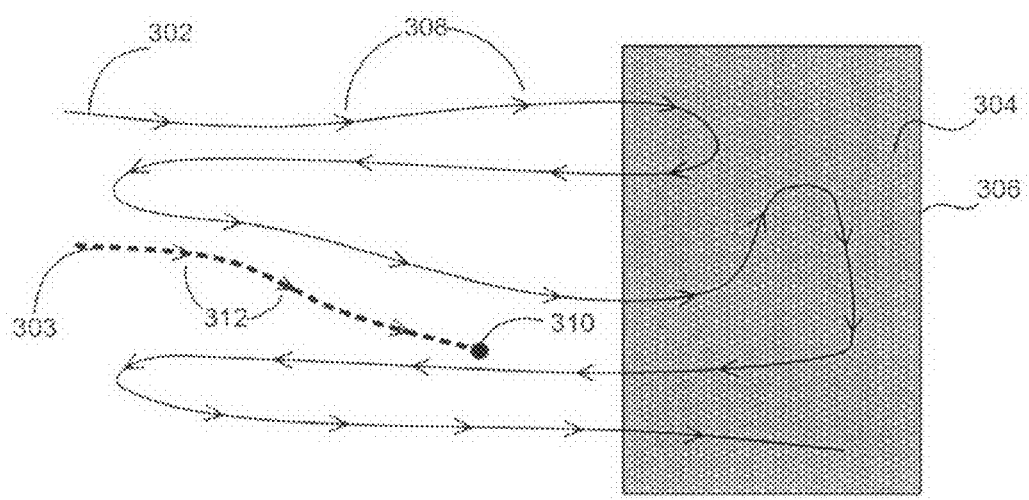
FIG. 3A, FIG. 3B, and FIG. 3C are examples used to further describe the embodiment of the present invention outlined in the detailed flow diagram of FIG. 2.
Figure 3B:
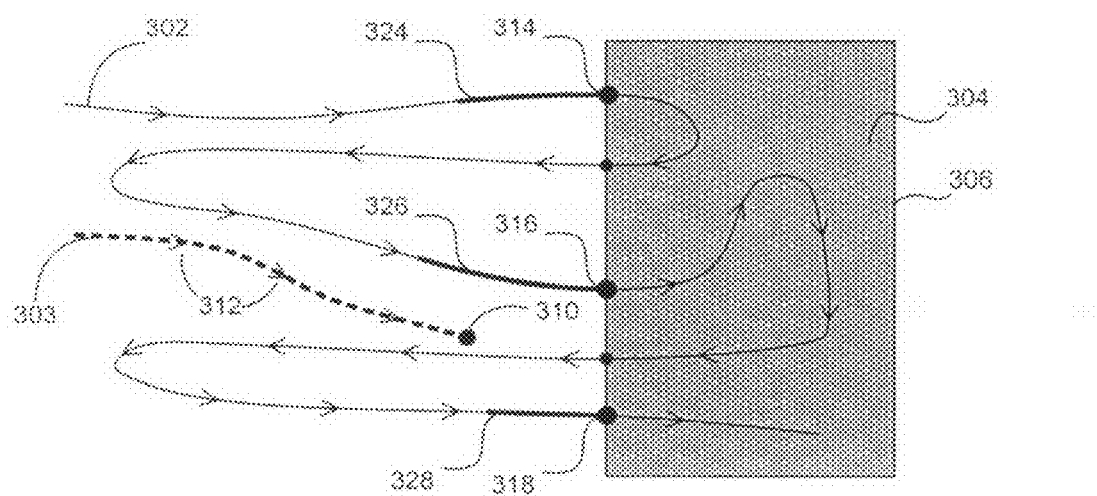
Figure 3C:
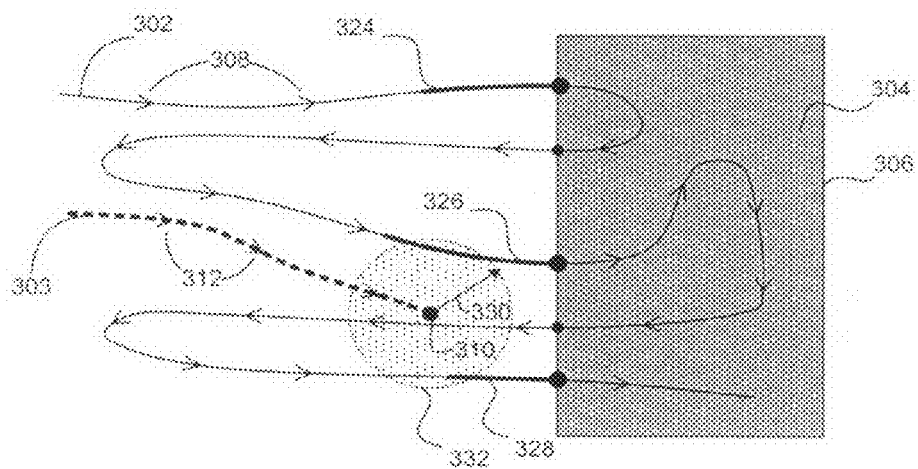

FIG. 3A, FIG. 3B, and FIG. 3C further describe the embodiment of the present invention outlined in the detailed flow diagram of FIG. 2. In FIG. 3A, a portion of a stored trajectory history 302 of a movable unit is depicted in exemplary, two-dimensional spatial coordinates (e.g., latitude and longitude pairs). The travel direction of the movable unit along the stored trajectory history is indicated by arrows 308 positioned along the stored trajectory history 302. The stored trajectory history 302 is compiled from spatial positions, velocities, and times that have been and that continue to be received and stored by the movable unit. FIG. 3A further depicts an exemplary target geographical region 304 defined by a set of boundaries 306 in the exemplary two-dimensional space. Additionally, FIG. 3A depicts a current spatial position 310 of the movable unit and a current portion 303 of the stored trajectory history 302 along which the movable unit has most recently traveled. In the example of FIG. 3A, the current spatial position 310 of the movable unit does not fall in the target geographical region 304 (step 206 in FIG. 2).

Although expressed in two-dimensional spatial coordinates within FIG. 3A, the stored trajectory history 302, the boundaries 306 of the target geographical region, the current spatial position 310 of the movable unit, and the current portion 303 of the stored trajectory history may be expressed in terms of three-dimensional spatial coordinates (e.g. triplets of latitude, longitude, and altitude), or in terms of any additional coordinate or positioning system that would be apparent to one skilled in the art(s).

In FIG. 3B, the stored trajectory history 302 crosses into the target geographical region at entry points 314, 316, and 318 (step 208). The stored trajectory history 302 is then traced away from entry points 314, 316, and 318 for a pre-determined time period to form candidate path segments 324, 326, and 328 that respectively correspond to entry points 314, 316, and 318 (step 210). Candidate path segments 324, 326, and 328 represent the portion of the stored trajectory history that was traversed by the movable unit during the pre-determined time period before entering the target geographical region.

The current spatial position of the movable unit is then matched against the candidate path segments to identify those candidate path segments that fall within a specified radial distance of the current spatial position (step 212). According to an embodiment shown in FIG. 3C, a radius 330 of specified distance is extended from the current spatial position 310 to form a circle 332 that is centered on the current spatial position. Candidate path segments 326 and 328 both fall within the circle, and as such, fall within the specified radius 330 of the current spatial position 310. Further, arrows 312 placed on the current portion 303 indicate the direction of travel of the movable unit along the current portion (step 214), and these arrows 312 indicate that the unit is traveling in the direction of the target geographical region (step 216). Accordingly, candidate path segments 326 and 328 may represent probable future trajectories over which the movable unit may travel during the pre-determined time period. As such, the generally broadcast message may be of interest to the user of the movable unit, and the generally broadcast message may be disseminated to the user using any of the techniques described herein in reference to FIG. 2.

Figure 4:
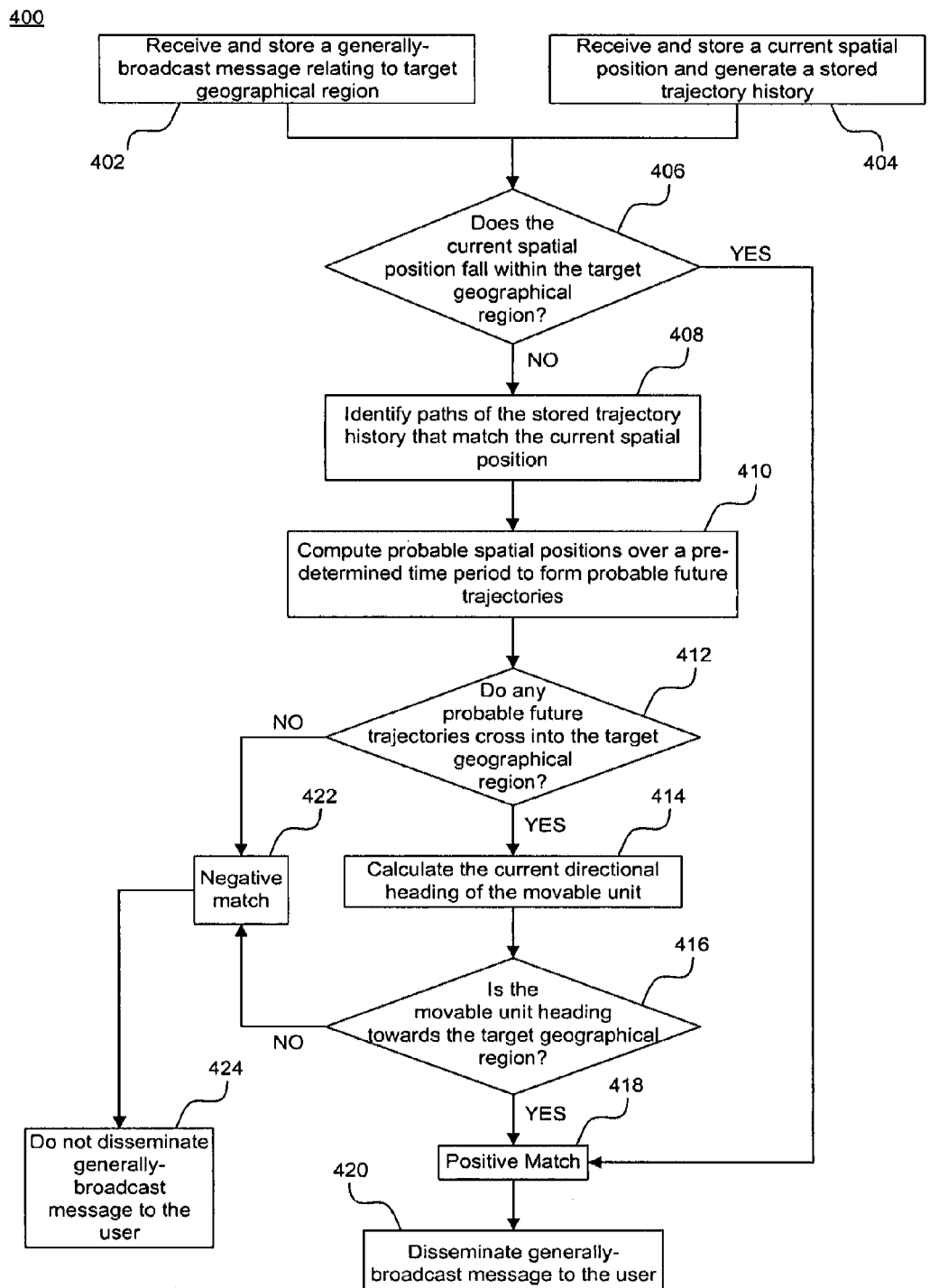
FIG. 4 is a detailed flow diagram of an additional embodiment of the exemplary method outlined in FIG. 1.

FIG. 4 is a detailed illustration of a second embodiment 400 for practicing the exemplary method outlined in FIG. 1. In FIG. 4, a movable unit receives and stores generally-broadcast message related to a target geographical region in step 402. The generally-broadcast message may include information on events that potentially interest or impact a user of the movable unit, including without limitation weather and/or traffic patterns across the geographic region, criminal or terrorist activity across the geographic region, or advertisements from merchants located within the geographic region. Further, the generally-broadcast message received within step 402 defines the boundaries of the target geographical region. In a preferred embodiment, the generally-broadcast message defines the boundaries of the target geographical region in terms of a longitude, a latitude, and an altitude of the target geographical region. Alternatively, the boundaries of the target geographical region may be defined in terms of any additional coordinate system that would be apparent to one skilled in the art(s).

In step 404, a current spatial position of the movable unit is received from an external positioning system, such as a global positioning system (GPS) or a LORAN system. A current velocity of the movable unit and a time associated with the current spatial position of the movable unit may also be received from an external positioning system. The current spatial position of the movable unit, the current velocity of the movable unit, and the current time are then stored, and the combination of current data and previously-stored data is used to generate the stored trajectory history of the movable unit.

The current spatial position of the movable unit that is received in step 404 may be expressed in terms of a current latitude of the movable unit, a current longitude of the movable unit, and a current altitude of the movable unit. Alternatively, the current spatial position of the movable unit may be expressed in terms of any other well known coordinate system. In additional embodiments, a user of the movable unit may manually enter the current spatial position of the movable unit through an appropriate interface, such as a keyboard or a keypad, or a voice input interface.

The generally-broadcast message, the current spatial position of the movable unit, and the stored trajectory history of the movable unit are then passed to step 406, which determines whether the current spatial position of the movable unit falls within the target geographical region. If the current spatial position of the movable unit falls within the target geographical region, then a positive match is identified in step 418 and the generally-broadcast message is disseminated to a user in step 420. The generally-broadcast message is disseminated to the user in step 420 through an oral alarm, a tactile alarm, a visual alarm, a combination of an oral, a tactile, and a visual alarm, or any appropriate display or messaging format that would be apparent to one skilled in the art(s).

If the current spatial position of the movable unit falls outside the target geographical region in step 406, then the stored trajectory history is processed in step 408 to identify paths within the stored trajectory history that fall within a specified time or distance of the current spatial position of the mobile unit. The identified paths are then passed to step 410, which computes probable spatial positions along each identified path over a pre-determined, future time period to form a set of probable future trajectories. The set of probable future positions are then passed to step 412, which determines whether any of the probable future positions fall within the target geographical region and thus, determines whether any of the corresponding probable future trajectories cross into the target geographical region.

If the results of step 412 indicate that at least one probable future trajectory crosses into the target geographical region, then the current travel direction of the movable unit is calculated within step 414. The current spatial position and the current travel direction are then used in step 416 to determine whether the movable unit is heading towards the target geographical region. If the movable unit is heading towards the target geographical region, then a positive match is identified within step 418. The positive match indicates that the movable unit will likely travel into the target geographical region within the pre-determined time period and that the generally-broadcast message may be of potential interest to the movable unit. The generally-broadcast message is then disseminated to the user of the movable unit in step 420 through an oral alarm, a tactile alarm, a visual alarm, a combination of an oral, a tactile, and a visual alarm, or any appropriate display or messaging format that would be apparent to one skilled in the art(s).

If the results of step 416 indicate that the movable unit is not heading towards the target geographical region, then a negative match is identified within step 422. The negative match indicates that the movable unit is unlikely to cross into the target geographical region during the pre-determined time period. Thus, the generally-broadcast message is unlikely to interest the user of the movable unit, and the generally-broadcast message is ignored within step 424 and is not disseminated to the user.

If the results of step 412 indicate that none of the probable future trajectories cross into the target geographical region, then a negative match is identified within step 422. The negative match indicates that the movable unit is unlikely to cross into the target geographical region during the pre-determined future time period. Thus, the generally-broadcast message is unlikely to interest the user of the movable unit and the generally-broadcast message is ignored within step 424 and is not disseminated.

The number of generally-broadcast messages disseminated within step 420 may be varied by adjusting the specified time or distance within step 408. By reducing the specified time or distance in step 408, the number of path segments that fall within the specified time or distance of the current spatial position of the movable unit may be reduced. Thus, fewer probable future trajectories may cross into the target geographical region and fewer generally-broadcast messages may be disseminated to the user. In contrast, by increasing the specified time or distance in step 408, a larger number of candidate path segments may fall within the specified time or distance of the current spatial position of the movable unit. As such, a larger number of probable future trajectories may cross into the target geographical region and a larger number of generally-broadcast messages may be disseminated to the user.

Figure 5A:
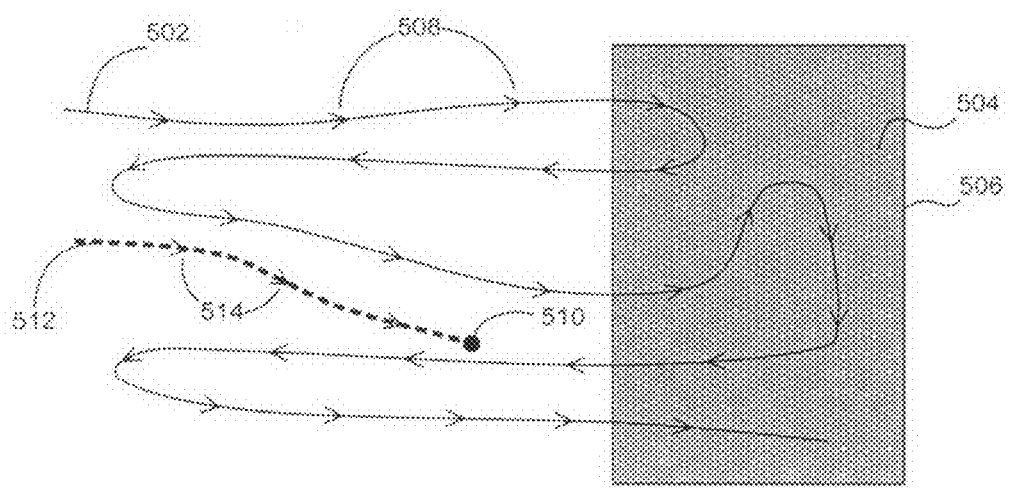
FIG. 5A, FIG. 5B, and FIG. 5C are examples used to further describe the embodiment of the present invention outlined in the detailed flow diagram of FIG. 4.
Figure 5B:
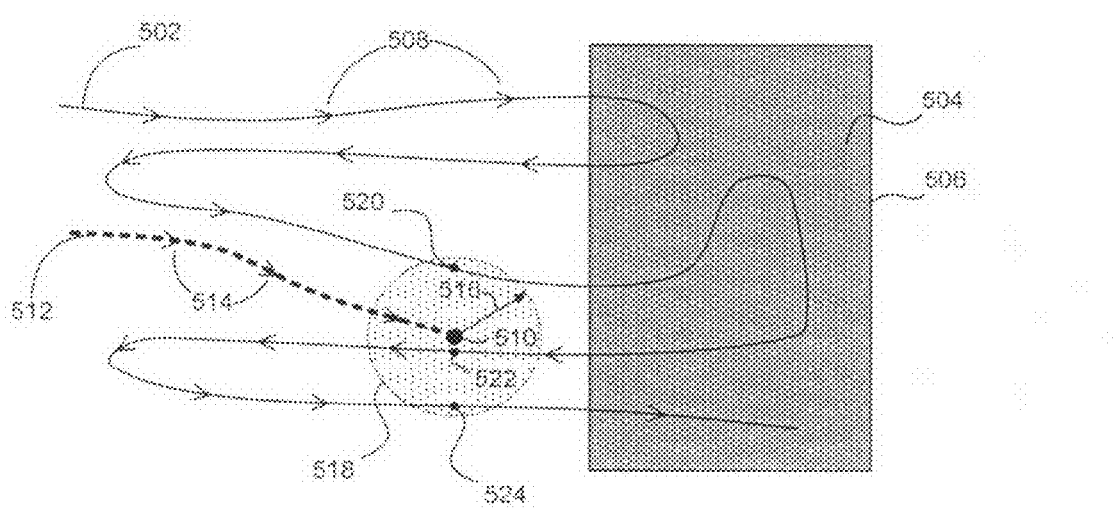
Figure 5C:
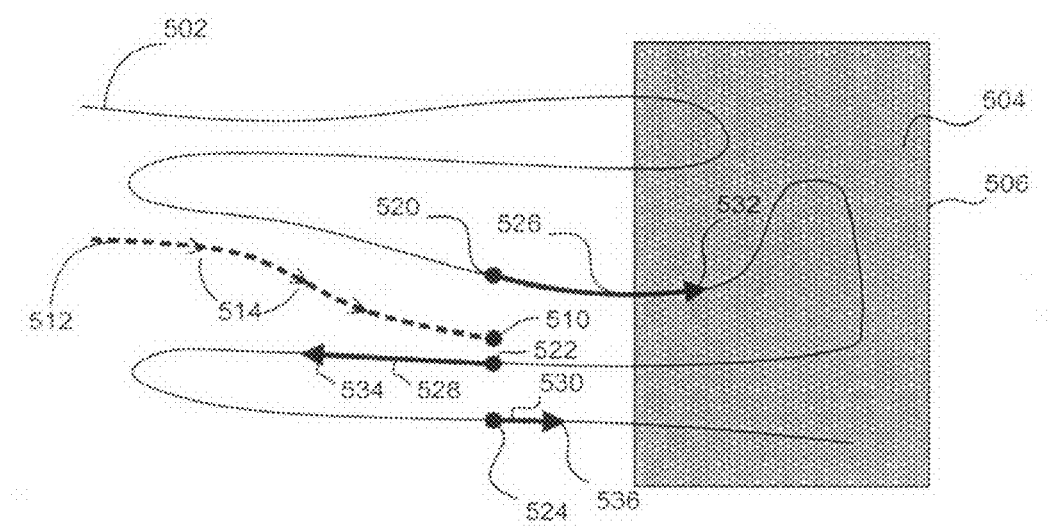

FIG. 5A, FIG. 5B, and FIG. 5C further describe the embodiment of the present invention outlined in the detailed flow diagram of FIG. 4. In FIG. 5A, a portion of a stored trajectory history 502 of a movable unit is depicted in exemplary, two-dimensional spatial coordinates (e.g., latitude and longitude pairs). The travel direction of the movable unit along the stored trajectory history is indicated by arrows 508 positioned along the stored trajectory history 502. The stored trajectory history 502 is compiled from the current spatial positions, current velocities, and current times that have been and that continue to be received and stored by the movable unit. FIG. 5A further depicts an exemplary target geographical region 504 defined by a series of boundaries 506 in the exemplary two-dimensional space. Additionally, FIG. 5A depicts a current spatial position 510 of the movable unit and a current portion 512 of the stored trajectory history 502 along which the movable unit has traveled. In the example of FIG. 5A, the current spatial position 510 of the movable unit does not fall in the target geographical region 504 (step 406 in FIG. 4).

Although expressed in two-dimensional spatial coordinates within FIG. 5A, the stored trajectory history 502, the boundaries 506 of the target geographical region, the current spatial position 510 of the movable unit, and the current portion 514 of the stored trajectory history may be expressed in terms of three-dimensional spatial coordinates (e.g. triplets of latitude, longitude, and altitude), or in terms of any additional coordinate system that would be apparent to one skilled in the art(s).

The stored trajectory history 502 is then processed to identify points along the stored trajectory history 502 that fall within a specified radial distance of a current spatial position 510 of the movable unit (step 408). In FIG. 5B, a radius 516 of specified distance is extended from the current spatial position 510 to form a circle 518 that is centered on the current spatial position, and FIG. 5B illustrates three exemplary points 520, 522, and 526 that fall within the radius 516 of the current spatial position 510.

In FIG. 5C, the stored trajectory history is traced forward in time from these identified points for a pre-determined future time period to identify a set of probable future trajectories 526, 528, and 530 (step 410). The direction of the movable unit along each probable future trajectory is indicated by arrows 532, 534, and 536 on the respective trajectories. Of the three probable future trajectories depicted in FIG. 5C, only probable future trajectory 526 crosses into the target geographical region 504 within the pre-determined future time period (step 412). Further, arrows 514 placed on the current portion 510 indicate the direction of travel of the movable unit along the current portion (step 414), and these arrows 514 indicate that the unit is traveling in the direction of the target geographical region (step 416). Accordingly, the movable unit may cross into the target geographical region within the pre-determined time period, and the generally broadcast message that relates to the target geographical region may be of interest to a user of the movable unit. As such, the generally broadcast message may be disseminated to the user of the movable unit using any of the techniques described herein in reference to FIG. 4.

Figure 6:
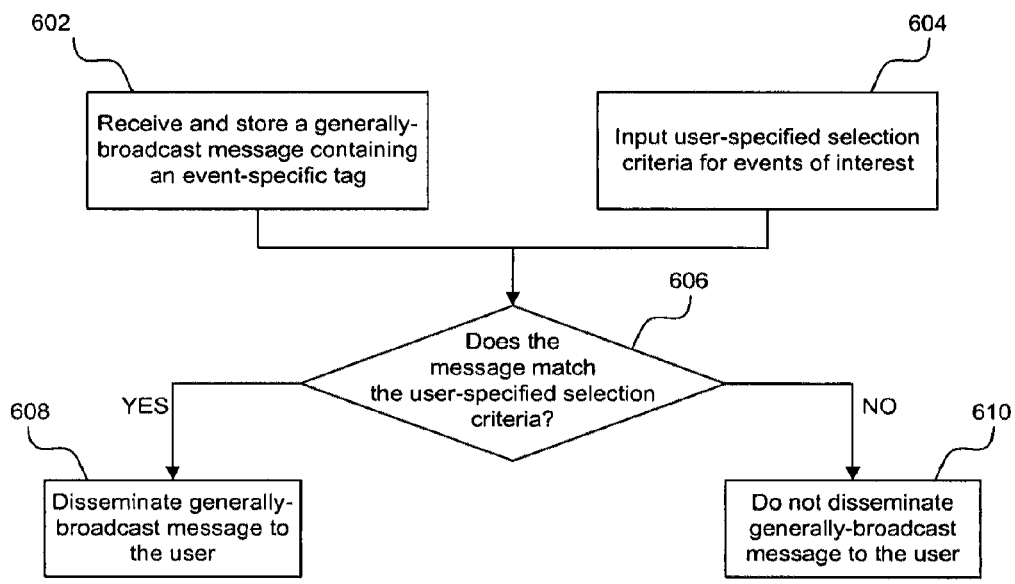
FIG. 6 is a detailed flow diagram of an exemplary method for filtering generally-broadcast messages based on user preferences, according to an embodiment of the invention.

FIG. 6 is a detailed flow diagram of an exemplary method 600 for filtering generally-broadcast messages received by a movable unit based on user preferences. In FIG. 6, a generally-broadcast message is received in step 602. The generally-broadcast message that is received within step 602 may include information on events that may interest or impact a user of the movable unit as the movable unit travels across a target geographical region. The generally-broadcast message may also include event-specific tags that characterize the events described by the generally-broadcast message. For example, generally-broadcast messages that relate to weather events within the target geographical region may be accompanied by a "weather" tag and generally-broadcast messages that relate to advertisements from merchants within the target geographical region may be accompanied by an "advertisement" tag.

A user of the movable unit may input user-specific selection criteria, such as additional event-specific tags, in step 604 that characterize events of potential interest to the user. For example, the user could specify that he or she is only interested in viewing generally-broadcast messages having a "weather" or an "advertisement" tag. The event-specific tags that accompany the generally-broadcast message and the event-specific tags that are specified by the user are then passed into step 606, which compares each set of event-specific tags. If the event-specific tags characterizing the generally-broadcast message match any of the event-specific tags provided by the user, then the generally-broadcast message is disseminated to the user in step 608. The generally-broadcast message may be disseminated in step 608 through an oral alarm, a tactile alarm, a visual alarm, a combination of an oral, a tactile, and a visual alarm, or it may incorporate any appropriate display or messaging format that would be apparent to one skilled in the art(s). If, in step 606, the event-specific tags characterizing the generally-broadcast message fail to match any of the event-specific tags provided by the user, then the generally-broadcast message is ignored within step 610 and is not disseminated to the user.

Although described within FIG. 6 as a separate embodiment of the present invention, the dissemination of generally-broadcast messages in response to event-specific tags may be incorporated in any of the embodiments described above with respect to FIG. 2 and FIG. 4. For example, a generally-broadcast message relating to potential weather phenomena in a target geographical region may be deemed of interest to a user through the methods outlined in FIG. 2 and FIG. 4. However, using the method of FIG. 6, the message would only be disseminated to the user if the user were to specify weather events amongst the specified event-specific tags. Otherwise, although geographically relevant, the generally-broadcast message would be deemed contextually irrelevant using the method of FIG. 6.

Figure 7:
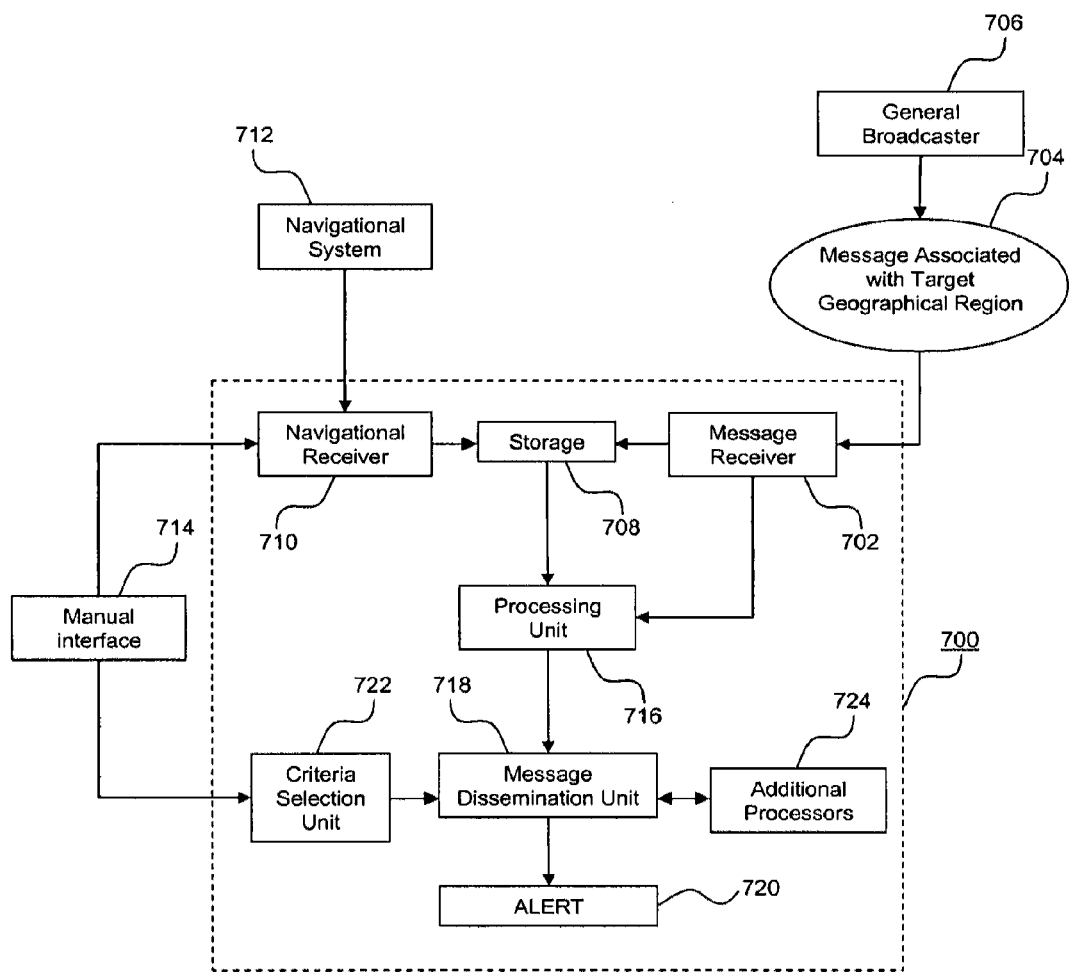
FIG. 7 is an exemplary system for filtering generally-broadcast messages received by a movable unit based on current spatial position, stored trajectory history, and probable future trajectories, according to an embodiment of the invention.

FIG. 7 is an exemplary system 700 for filtering generally-broadcast messages received by a movable unit based on current spatial position, stored trajectory history, and probable future trajectories. The exemplary system 700 comprises a message receiver 702 that receives a generally-broadcast message 704 from a general broadcaster 707. Once the generally-broadcast message is received at the message receiver 702, the generally-broadcast message is stored within a storage unit 708.

The generally-broadcast message is associated with a target geographical region and may include information on events that potentially interest or impact a user of the movable unit, including without limitation weather and/or traffic patterns across the target geographic region, criminal or terrorist activity across the target geographic region, or advertisements from merchants located within the target geographic region. Further, the generally-broadcast message defines the boundaries of the target geographical region. In a preferred embodiment, the generally-broadcast message defines the boundaries of the target geographical region in terms of a longitude, a latitude, and an altitude of the target geographical region. Alternatively, the boundaries of the target geographical region may be defined in terms of any additional coordinate system that would be apparent to one skilled in the art(s). The generally-broadcast message may additionally include event-specific tags that characterize the events associated with the generally-broadcast message;

The exemplary system also comprises a navigational receiver 710 in communication with an external navigational system 712, such as a global positioning system (GPS) or a LORAN system. Navigational system 712 may transmit a current spatial position of the movable unit to navigational receiver 710, and the navigational receiver in turn transmits the current spatial position of the movable unit to the storage unit 708. The navigation system 712 may additionally transmit a current velocity of the movable unit and a time associated with the current spatial position of the movable unit to the navigational receiver 710, which then transmits the additional data to the storage unit 708.

In preferred embodiments, the current spatial position of the movable unit may be expressed in terms three-dimensional spatial coordinates, including current latitude of the movable unit, a current longitude of the movable unit, and a current altitude of the movable unit. Alternatively, the current spatial position of the movable unit may be expressed in terms of any other agreed-upon coordinate system. In additional embodiments, a user of the movable unit may manually enter the current spatial position of the movable unit through an appropriate interface 714, such as a keyboard or a keypad, or voice input device.

The storage unit 708 then stores the current spatial position of the movable unit, the current velocity of the movable unit, and the current time associated with the current spatial position. The storage unit combines current and previously-stored spatial positions, velocities, and times to generate a stored trajectory history of the movable unit, which is then transmitted to a processing unit 716 along with the stored information that defines the boundaries of the target geographical region.

The processing unit 716 then determines whether the current spatial position of the movable unit falls within the boundaries of the target geographic region. If the current spatial position of the movable unit falls within the target geographical region, then the generally-broadcast message is processed by a message dissemination unit 718 and delivered to a user in the form of alert 720. The alert 720 may incorporate an oral alarm, a tactile alarm, a visual alarm, a combination of an oral, a tactile, and a visual alarm, or it may incorporate any appropriate display or messaging format that would be apparent to one skilled in the art(s).

If the current spatial position of the movable unit does not fall within the target geographical region, then the processing unit 716 computes a set of probable future trajectories of the movable unit over a pre-determined time period based on the current spatial position and the current velocity of the movable unit, the stored trajectory history of the movable unit, a current travel direction of the movable unit, and the boundaries of the target geographical region.

The processing unit 716 may utilize two techniques to compute the set of probable future trajectories over the pre-determined time period. In one embodiment, corresponding to the flowchart of FIG. 2, the processing unit identifies spatial locations, or entry points, through which the stored trajectory history crosses into the target geographical region. Starting at each entry point, the stored trajectory history is then traced away from the target geographical region for a pre-determined time period to identify a set of candidate path segments. Each of candidate path segments represents the portion of the stored trajectory history that was traversed by the movable unit over the pre-determined period of time before entering the target geographical region.

The candidate path segments are then processed to determine whether the current spatial position of the movable unit falls within a specified distance of any candidate path segments. If the current spatial position falls within the specified distance of at least one candidate path segment, the processing unit 716 computes a current travel direction of the movable unit to determine whether the movable unit is heading towards the target geographical region.

In an additional embodiment, corresponding to the flowchart of FIG. 4, the processing unit 716 identifies paths within the stored trajectory history that fall within a specified distance of the current spatial position. The processing unit 716 computes probable spatial positions along each identified path over a pre-determined time period to generate a set of probable future trajectories. The processing unit 716 then determines whether any of the probable future trajectories cross into the target geographical region. If any of the probable future trajectories cross into the target geographical region, then a current travel direction of the movable unit is calculated to determine whether the movable unit is heading towards the target geographical region.

In either embodiment, if the movable unit is heading towards the target geographical region, the movable unit will likely travel into the target geographical region within the pre-determined time period. As such, the generally-broadcast message may be of potential interest to the movable unit. The generally-broadcast message is then processed by a message dissemination unit 718 and delivered to a user in the form of an alert 720. The alert 720 may incorporate an oral alarm, a tactile alarm, a visual alarm, a combination of an oral, a tactile, and a visual alarm, or it may incorporate any appropriate display or messaging format that would be apparent to one skilled in the art(s).

The dissemination of the generally-broadcast messages may also be based on the contents of the generally-broadcast message, and the message dissemination unit 718 may be coupled to an additional criterion selection unit 722 in order to assess the content of the generally-broadcast messages. The generally-broadcast message may include event-specific tags that characterize the events described by the generally-broadcast message. For example, generally-broadcast messages that relates to weather events within the target geographical region may be accompanied by a "weather" tag and generally-broadcast messages that relates to advertisements from merchants within the target geographical region may be accompanied by an "advertisement" tag. A user of the movable unit may input user-specific selection criteria to the criterion selection unit 722, including additional event-specific tags that characterize events of potential interest to the user. For example, the user could specify that he or she is only interested in receiving generally-broadcast messages characterized by a "weather" or an "advertisement" tag.

The message dissemination unit 718 then compares the event-specific tags that characterize the generally-broadcast message with the event-specific tags that are specified by the user, and then disseminates the generally-broadcast message in response to a match between the event-specific tags characterizing the generally-broadcast message and the event-specific tags provided by the user. The generally-broadcast message may be delivered to a user in the form of alert 720. The alert 720 may incorporate an oral alarm, a tactile alarm, a visual alarm, a combination of an oral, a tactile, and a visual alarm, or it may incorporate any appropriate display or messaging format that would be apparent to one skilled in the art(s).

The exemplary system 700 may also incorporate additional processing units 724 to augment the processing unit 716 and the message dissemination unit 718. For example, message dissemination unit 718 may use the additional processing units 724 to determine whether the event-specific tags that have been specified by the user match those that characterize the generally-broadcast message. Further, the additional processing units 724 may form an integral part of the system 700, or they may be located externally to the system 700.

Figure 8:
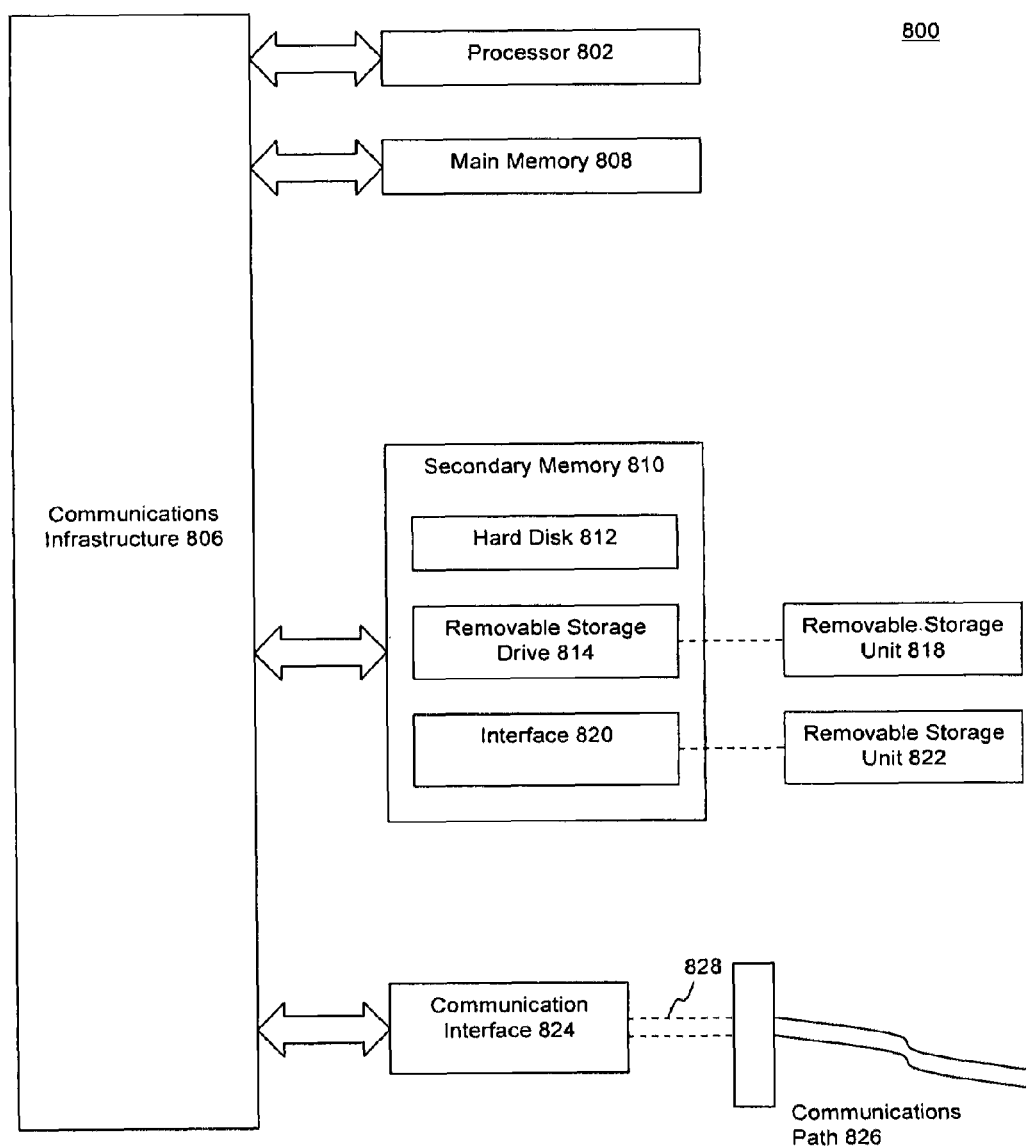
FIG. 8 is an exemplary computer architecture upon which the methods, systems, and computer program products of the present invention may be implemented, according to an embodiment of the invention.

FIG. 8 is an exemplary computer architecture upon which the methods, systems, and computer program products of the present invention may be implemented, according to an embodiment of the invention. The exemplary computer system 800 includes one or more processors, such as processor 802. The processor 802 is connected to a communication infrastructure 806, such as a bus or network. Various example software implementations are described in terms of this exemplary computer system. After reading this description, it will become apparent to a person skilled in the relevant art how to implement the invention using other computer systems and/or computer architectures.

Computer system 800 also includes a main memory 808, preferably random access memory (RAM), and may include a secondary memory 810. The secondary memory 810 may include, for example, a hard disk drive 812 and/or a removable storage drive 814, representing a magnetic tape drive, an optical disk drive, CD/DVD drive, etc. The removable storage drive 814 reads from and/or writes to a removable storage unit 818 in a well-known manner. Removable storage unit 818 represents a magnetic tape, optical disk, or other storage medium that is read by and written to by removable storage drive 814. As will be appreciated, the removable storage unit 818 can include a computer usable storage medium having stored therein computer software and/or data.

In alternative implementations, secondary memory 810 may include other means for allowing computer programs or other instructions to be loaded into computer system 800. Such means may include, for example, a removable storage unit 822 and an interface 820. An example of such means may include a removable memory chip (such as an EPROM, or PROM) and associated socket, or other removable storage units 822 and interfaces 820, which allow software and data to be transferred from the removable storage unit 822 to computer system 800.

Computer system 800 may also include one or more communications interfaces, such as communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828, which may be electronic, electromagnetic, optical or other signals capable of being received by communications interface 824. These signals 828 are provided to communications interface 824 via a communications path (i.e., channel) 826. This channel 826 carries signals 828 and may be implemented using wire or cable, fiber optics, an RF link and other communications channels. In an embodiment of the invention, signals 828 comprise data packets sent to processor 802. Information representing processed packets can also be sent in the form of signals 828 from processor 802 through communications path 826.

The terms "computer program medium" and "computer usable medium" are used to refer generally to media such as removable storage units 818 and 822, a hard disk installed in hard disk drive 812, and signals 828, which provide software to the computer system 800.

Computer programs are stored in main memory 808 and/or secondary memory 810. Computer programs may also be received via communications interface 824. Such computer programs, when executed, enable the computer system 800 to implement the present invention as discussed herein. In particular, the computer programs, when executed, enable the processor 802 to implement the present invention. Where the invention is implemented using software, the software may be stored in a computer program product and loaded into computer system 800 using removable storage drive 814, hard drive 812 or communications interface 824.

CONCLUSION

The present invention provides a method for filtering generally-broadcast messages in response to current spatial position, previous path trajectories, and probable destination. The present invention also provides a system that filters generally-broadcast messages in response to a current spatial position, previous path trajectories, and a probable destination.

The present invention receives the current spatial position of a movable unit and stores the current spatial position to form a stored trajectory history of the movable unit. Based on the current spatial position of the movable unit, the stored trajectory history of the movable unit, and a computed travel direction of the movable unit, the present invention computes probable future trajectories of the movable unit over a pre-determined time period. The present invention then filters a generally-broadcast message associated with a target geographical region on the basis of the probable future trajectories of the movable unit crossing into the target geographical region.

The present invention also filters a generally-broadcast message based on the contents of the generally-broadcast message. A user of the present invention specifies event-specific tags that are subsequently matched against the event-specific tags that characterize the generally-broadcast message. The present invention then disseminates the generally-broadcast message in response to a match between the event-specific tags provided by the user and the event-specific tags characterizing the generally-broadcast message.

The present invention increases the relevance of generally-broadcast messages that are disseminated to a user, as these messages have been filtered on the basis of current spatial position, past trajectory history, probable future trajectory, and user preferences.

The foregoing description of the specific embodiments will so fully reveal the general nature of the invention that others can, by applying knowledge within the skill of the art (including the contents of any references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of disseminating messages to a movable unit in a wireless mobile network, comprising: adding a current spatial position of the movable unit to a trajectory history of the movable unit; receiving at a computer system coupled to a communications interface, a generally-broadcast message relating to a target geographical region; computing, using the computer system, a potential trajectory of the movable unit over a pre-determined time period based on at least one of: (i) the current spatial position, (ii) a travel direction of the movable unit, and (iii) the trajectory history of the movable unit, wherein the computing comprises: identifying, from the trajectory history, paths that cross into the target geographical region, tracing the identified paths away from the target geographical region for the pre-determined time period to establish a set of candidate path segments, computing the travel direction for the movable unit based on the trajectory history, and selecting a candidate path segment from among the set of candidate path segments to be the potential trajectory, the selecting based on at least one of: (i) the current spatial position of the movable unit matching the candidate path segments, and (ii) the computed travel direction of the movable unit pointing towards the target geographical region; and disseminating using the communications interface, the generally-broadcast message in response to the potential trajectory crossing into the target geographical region.

2. The method of claim 1, wherein the current spatial position of the movable unit comprises at least one of a current longitude, a current latitude, and a current altitude the movable unit.

3. The method of claim 1, further comprising storing at least one of: (i) a current velocity of the movable unit and (ii) a time associated with the current spatial position of the movable unit.

4. The method of claim 1, wherein the adding step further comprises receiving the current spatial position information of the movable unit from an external spatial positioning system.

5. The method of claim 4, wherein the external spatial positioning system comprises at least one of a global positioning system (GPS) and a LORAN system.

6. The method of claim 1, wherein the generally-broadcast message comprises at least one of a longitude, a latitude, and an altitude describing the target geographical region.

7. The method of claim 1, wherein the selected candidate path segment is selected to be the potential trajectory based on the current spatial position of the movable unit falling within a pre-determined distance of the selected candidate path segment.

8. The method of claim 1, further comprising disseminating the generally-broadcast message in response to the current spatial position of the movable unit falling within the target geographical region.

9. A method of disseminating messages to one or more movable units in a wireless mobile network, comprising: adding a current spatial position of the movable unit to a trajectory history of the movable unit; receiving at a computer system coupled to a communications interface, a generally-broadcast message relating to a target geographical region; computing using the computer system a potential trajectory of the movable unit over a pre-determined time period based on at least one of: (i) the current spatial position, (ii) a travel direction of the movable unit, and (iii) the trajectory history of the movable unit, wherein the computing comprises: identifying, from the trajectory history, paths that match the current spatial position of the movable unit, tracing each identified path forward in time from the current spatial position of the movable unit for the pre-determined time period to generate a set of candidate path segments, computing the travel direction of the movable unit based on the trajectory history, and selecting a candidate path segment from among the set of candidate path segments to be the potential trajectory, the selecting based on at least one of: (i) the candidate path segments crossing into the target geographical region, and (ii) the computed travel direction of the movable unit pointing towards the target geographical region; and disseminating using the communications interface, the generally-broadcast message in response to the potential trajectory crossing into the target geographical region.

10. The method of claim 9, wherein the selected candidate path segment is selected to be the potential trajectory based on the current spatial position of the movable unit falling within a pre-determined distance of spatial positions along the paths within the trajectory history.

11. A method of disseminating messages to one or more movable units in a wireless mobile network, comprising: adding a current spatial position of the movable unit to a trajectory history of the movable unit; receiving at a computer system coupled to a communications interface, a generally-broadcast message relating to a target geographical region, wherein the generally-broadcast message comprises one or more event-specific tags related to events within the target geographic region; computing using the computer system, potential trajectories of the movable unit over a pre-determined time period based on at least one of: (i) the current spatial position, (ii) a travel direction of the movable unit, and (iii) the trajectory history of the movable unit; and disseminating using the communications interface, the generally-broadcast message in response to: at least one potential trajectory crossing into the target geographical region, and a match between the event-specific tags related to events within the target geographic region and the event-specific tags related to events of interest to the movable unit, wherein the disseminating comprises at least one of: (i) presenting the generally-broadcast message to a user, (ii) activating an aural alarm, (iii) activating a tactile alarm, (iv) activating a visual alarm, and (v) activating an additional device.

12. The method of claim 11, wherein the event-specific tags represent at least one of: (i) advertisements from merchants within the target geographical region, (ii) weather events within the target geographical region, (iii) emergencies within the target geographical region, and (iv) events of interest to residents and visitors on the target geographical region.

13. A system for disseminating messages to one or more movable units in a wireless mobile network, comprising: a module to add a current spatial position of the movable unit to a trajectory history of the movable unit; a receiver for receiving a generally-broadcast message relating to a target geographical region; a module to identify, from the trajectory history, paths that cross into the target geographical region; a module to trace the identified paths away from the target geographical region for the pre-determined time period to establish a set of candidate path segments; a module to compute the travel direction for the movable unit based at least the trajectory history; a module to select a candidate path segment from among the set of candidate path segments to be the potential trajectory, the selecting based on at least one of: (i) the current spatial position of the movable unit matching the candidate path segments, and (ii) the computed travel direction of the movable unit pointing towards the target geographical region; and a module to disseminate the generally-broadcast message in response to the potential trajectory crossing into the target geographical region.

14. The system of claim 13, wherein the current spatial position of the movable unit comprises at least one of a current longitude, a current latitude, and a current altitude the movable unit.

15. The system of claim 13, further comprising a module to store at least one of a current velocity of the movable unit and a time associated with the current spatial position of the movable unit.

16. The system of claim 13, wherein the module to add further comprises a module to receive the current spatial position information from an external spatial positioning system.

17. The system of claim 16, wherein the external spatial positioning system comprises at least one of a global positioning system (GPS) and a LORAN system.

18. The system of claim 13, wherein the generally-broadcast message comprises at least one of a longitude, a latitude, and an altitude describing the target geographical region.

19. The system of claim 13, wherein the module to select further comprises a module to match the current spatial position of the movable unit to the candidate path segments in response to the current spatial position falling within a pre-determined distance of spatial positions along the candidate path segments.

20. The system of claim 13, wherein the module to disseminate also disseminates the generally-broadcast message in response to the current spatial position of the movable unit falling within the target geographical region.

21. The system of claim 13, wherein the module to disseminate further comprises at least one of: (i) a module to present the generally-broadcast message to a user, (ii) a module to activate an aural alarm, (iii) a module to activate a tactile alarm, (iv) a module to activate a visual alarm, and (v) a module to activate an additional device.

22. The system, of claim 13, wherein the generally-broadcast message further comprises one or more event-specific tags related to events within the target geographic region.

23. The system of claim 22, further comprising:
module to store event-specific tags related to events of interest to the movable unit, wherein the module to disseminate also disseminates the generally-broadcast message in response to a match between the event-specific tags related to events within the target geographic region and the event-specific tags related to events of interest to the movable unit.

24. The system of claim 22, wherein the event-specific tags represent at least one of: (i) advertisements from merchants within the target geographical region, (ii) weather events within the target geographical region, (iii) emergencies within the target geographical region, and (iv) events of interest to residents and visitors to the target geographical region.

25. A system for disseminating messages to one or more movable units in a wireless mobile network, comprising: a module to add a current spatial position of the movable unit to a trajectory history of the movable unit; a receiver for receiving a generally-broadcast message relating to a target geographical region; a module to identify, from the trajectory history, paths that match the current spatial position of the movable unit; a module to trace each identified path forward in time from the current spatial position of the movable unit for the pre-determined time period to generate a set of candidate path segments; a module to compute the travel direction for the movable unit based at least the trajectory history; a module to select a candidate path segment from among the set of candidate path segments to be the potential trajectory, the selecting based on at least one of: (i) the candidate path segments crossing into the target geographical region, and (ii) the computed travel direction of the movable unit pointing towards the target geographical region; and a module to disseminate the generally-broadcast message when the potential trajectory crosses into the target geographical region.

26. The system of claim 25, wherein the module to identify identifies paths within the trajectory history that fall within a pre-determined distance of past spatial positions of the movable unit along the trajectory history.

27. A computer program product comprising a computer readable storage medium having computer program logic stored thereon for enabling a processor to perform operations to disseminate messages to one or more movable units in a wireless mobile network, the operations comprising: adding a current spatial position of the movable unit to a trajectory history of the movable unit; receiving at a computer system coupled to a communications interface, a generally-broadcast message relating to a target geographical region; computing, using the computer system, a potential trajectory of the movable unit over a pre-determined time period based on at least one of: (i) the current spatial position, (ii) a travel direction of the movable unit, and (iii) the trajectory history of the movable unit, wherein the computing comprises: identifying, from the trajectory history, paths that cross into the target geographical region, tracing the identified paths away from the target geographical region for the pre-determined time period to establish a set of candidate path segments, computing the travel direction for the movable unit based on the trajectory history, and selecting a candidate path segment from among the set of candidate path segments to be the potential trajectory, the selecting based on at least one of: (i) the current spatial position of the movable unit matching the candidate path segments, and (ii) the computed travel direction of the movable unit pointing towards the target geographical region; and disseminating using the communications interface, the generally-broadcast message in response to the potential trajectory crossing into the target geographical region.

* * * * *